Figure 2:
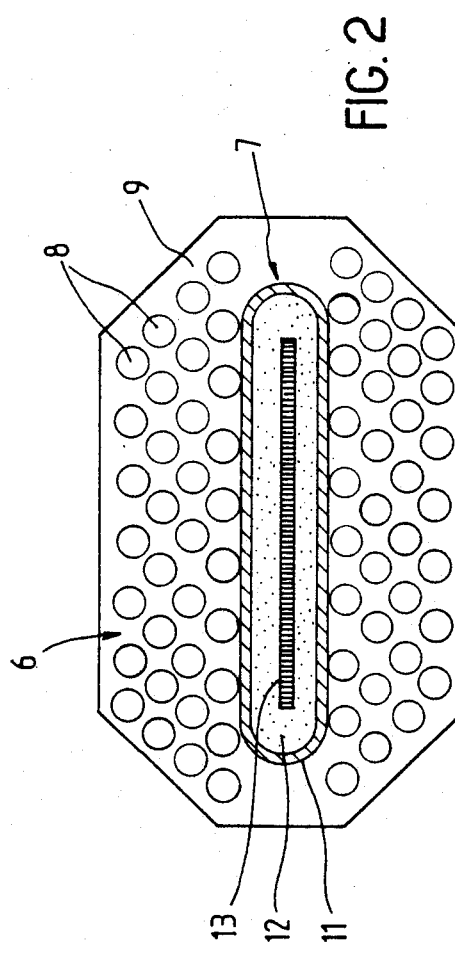

United States Patent [19]

Aubry et al.

[11] Patent Number: 4,822,245

[45] Date of Patent: Apr. 18, 1989

[54] TORSIBLE, FLEXIBLE LINKING ARM WITH INTEGRATED FLEXION DAMPING, IN PARTICULAR FOR LINKING A ROTOR BLADE TO ITS HUB, AND ROTOR AND HUB EQUIPPED WITH SUCH ARMS

[75] Inventors: Jacques A. Aubry, Cabries; Jean J. E. Azeau, Gardanne, both of France

[73] Assignee: Aerospatiale Societe Nationale Industrielle, Paris, France

[21] Appl. No.: 201,160

[22] Filed: Jun. 2, 1988

[30] Foreign Application Priority Data

Jun. 4, 1987 [FR] France .................................. 8707778

[51] Int. Cl.$^4$ ............................................. B64C 27/38
[52] U.S. Cl. .................... 416/134 A; 416/140; 416/141; 267/140.1
[58] Field of Search .......... 416/134 A, 140 A, 140 R; 267/140.1, 227, 279

[56] References Cited

U.S. PATENT DOCUMENTS

| | | | |
|---|---|---|---|
| 3,669,566 | 6/1972 | Bourquardez et al. | 416/134 A |
| 3,758,230 | 9/1973 | Potter | 416/140 A X |
| 3,765,267 | 10/1973 | Bourquardez et al. | 416/134 A X |
| 3,923,419 | 12/1975 | Mouille | 416/140 A X |
| 4,227,858 | 10/1980 | Donguy | 416/134 A |
| 4,386,989 | 6/1983 | Aubry | 416/134 A X |
| 4,566,677 | 1/1986 | Pierres | 416/140 A X |
| 4,593,889 | 6/1986 | Odobasic | 416/141 X |
| 4,627,635 | 12/1986 | Koleda | 267/140.1 X |
| 4,666,372 | 5/1987 | Avila et al. | 267/279 X |
| 3,762,8343 | 10/1973 | Bourquardez et al. | 416/134 A |

FOREIGN PATENT DOCUMENTS

| | | | |
|---|---|---|---|
| 3148903 | 6/1983 | Fed. Rep. of Germany | 416/140 X |
| 3438557 | 4/1986 | Fed. Rep. of Germany | 416/134 A |
| 2041747 | 5/1971 | France | 416/134 A |

Primary Examiner—Everette A. Powell, Jr.
Attorney, Agent, or Firm—Armstrong, Nikaido Marmelstein & Kubovcik

[57] ABSTRACT

The torsible, flexible linking arm with integrated flexion damping according to the invention includes, between two rigid end portions, a flexible central portion constituted by a peripheral bundle (6) of rods (8) of fibres with high mechanical strength encapsulated in a flexible, vulcanized elastomer (9), and by a central damping core (7) with a strip (13) shearing a damping gel (12) filling a tight, flexible bladder (11) embedded in the elastomer (9). When deformations occur in the plane of the strip (13), the latter shears the gel (12), which produces damping that is added to that resulting from the deformation remanence of the elastomer (9). Application to the linking of two rigid bodies such as a rotor blade and its hub.

22 Claims, 4 Drawing Sheets

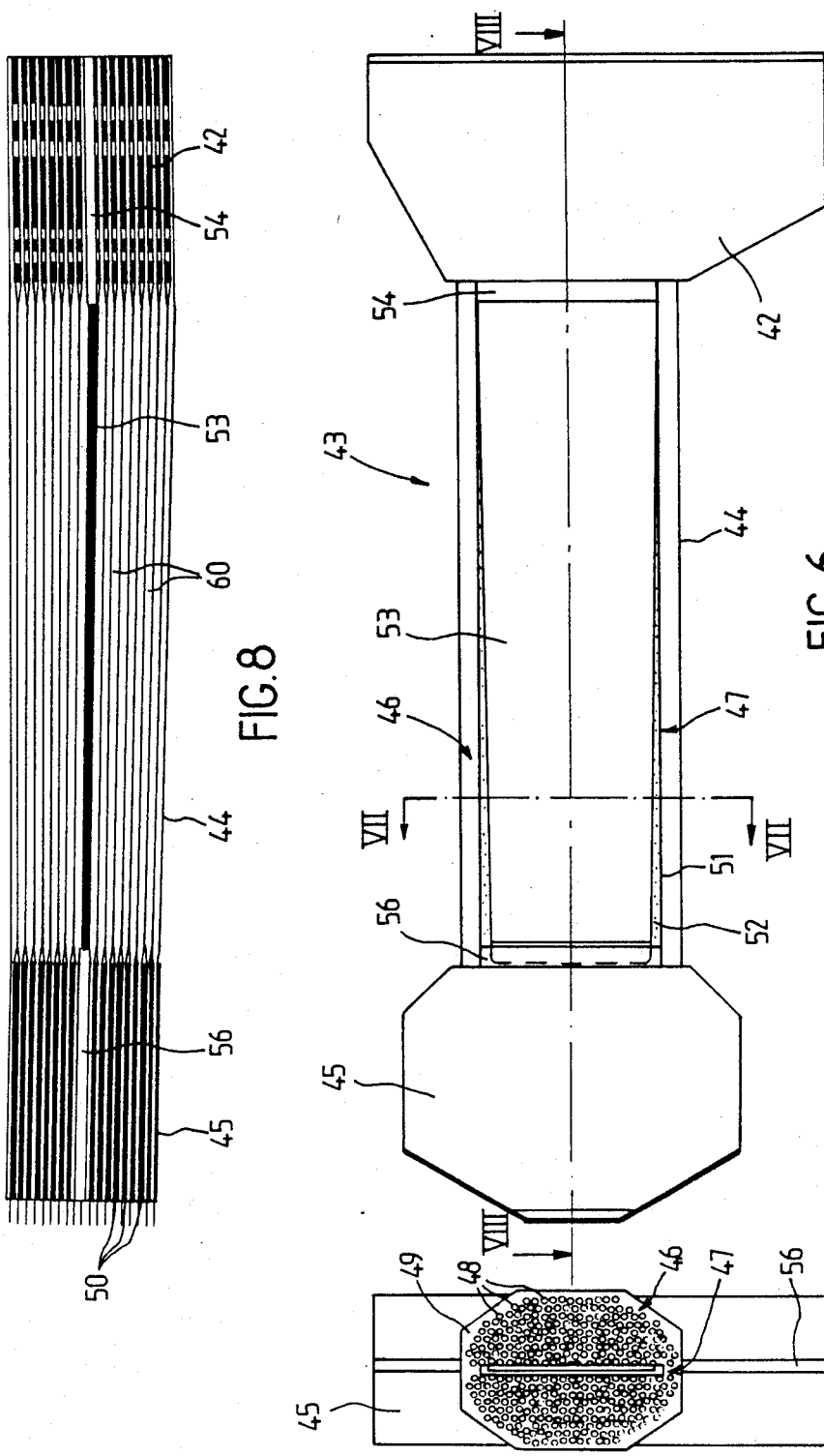

TORSIBLE, FLEXIBLE LINKING ARM WITH INTEGRATED FLEXION DAMPING, IN PARTICULAR FOR LINKING A ROTOR BLADE TO ITS HUB, AND ROTOR AND HUB EQUIPPED WITH SUCH ARMS

The present invention relates essentially to a linking arm rigid in traction along its longitudinal axis but resilient in flexion and torsion and comprising integrated flexion damping, designed to link together two relatively rigid bodies and, in particular, to link a rotor blade to its hub.

A further object of the invention is an application of such a linking arm to the constitution of rotors and rotor hubs without articulation equipped with such arms, in particular for aerodynes with rotary aerofoils, such as helicopters.

French patent No. 2 041 747, relating to an element linking together two bodies permitting their relative rotation about three axes and its application to the constitution of rotors without articulation, already proposes a linking element or arm permitting limited relative displacements of these two bodies equivalent to rotations about at least one axis and, preferably, about three axes orthogonal two by two, and comprising, between two rigid end portions, each designed to be attached to or at least partially integrated with one of the bodies, an elongated central body, elastic in flexion and torsion, ensuring with damping spring bias towards a mean rest position of the two bodies, and which includes a composite longitudinal bundle of substantially unidirectional rods of high mechanical strength, in particular tensile strength, each of which possesses a certain degree of elasticity in flexion and is formed by the agglomeration of a large number of mineral or synthetic fibres and/or filaments by a polymerised synthetic impregnation resin, each rod being individually encapsulated by a flexible vulcanised elastomer, having a relatively low shearing factor and considerable deformation remanence, and which forms a matrix linking together the said rods to form the said composite bundle.

It is well known, in fact, that rotors of different types, such as those of fans or blowers, as well as those equipping rotary aerofoil aerodynes, in particular the antitorque rotors and the lift rotors of helicopters, necessitate a link between the blades and their hub permitting several degrees of freedom.

In the lift or main rotors of helicopters, in particular, each blade must be able to oscillate in flapping, perpendicularly to the plane of rotation of the rotor, and in trailing, in the plane of rotation of the rotor, and be able to rotate about its longitudinal axis, for changes in the pitch of the blade.

Conventionally, these oscillations and this rotation have been ensured by means of separate articulations, with pins pivoting in antifriction bearings, but it has often been proposed to dispense with one or more of these hinges, for the purpose of simplifying the structure, improving reliability and reducing the manufacturing and maintenance costs of these conventionally designed hubs.

These proposals finally led to the manufacture of rotor hubs termed "without articulation" or "non-articulated", and the flexible linking arm proposed in French patent No. 2 041 747 aforementioned, and offering a possibility of limited rotation about three axes orthogonal two by two which corresponds to the three degrees of freedom permitted by a ball joint, is particularly suitable for providing the link between a rotor blade and its hub, within the context of such a rotor with a hub "without articulation" or "non-articulated".

Indeed, the combination of the values of mechanical strength in traction and the modulus of elasticity of the fibre rods of the composite bundle contributes to making the linking arm flexible in flexion with spring bias towards the initial position, while the relatively low shearing modulus of the encapsulating elastomer, the proportion of which in the composite bundle is between approximately 20 and 50%, as well as its deformation remanence permit respectively relative movements of the rods in the bundle, when the latter is deformed in torsion and flexion, and dynamic damping of the movements to which the composite bundle is subjected. In addition, it has been proposed, on one hand, that the elongated central portion, in the form of a ternary composite bundle constituted by the fibres, the polymerised, rigid resin for agglomeration into rods, and the flexible elastomer for encapsulating the rods, be surrounded by an inextensible deformable sheath forming a bond or collar imprisoning the elastomer and, on the other hand, that a good connection between the composite flexible bundle and the rigid end portions be ensured by extending the rods of the bundle into the said end portions, with which the rods are made integral by a polymerised thermosetting resin whose rigidity is far greater than that of the elastomer encapsulating the rods of the elongated bundle, which thermosetting resin can, in particular, be an epoxide type resin, identical or otherwise with the one that agglomerates the fibres and filaments into rods, and the rigid end portions can, in addition to the rods, possess complementary reinforcing armatures, such as plates of metal or glass fibre fabric, forming, preferably, layers alternating with layers of rods.

In order to permit the reliable, simple and economical industrial manufacture of elongated elements elastic in flexion and torsion, each designed to connect two members, possessing high strength in traction while remaining flexible in torsion about their longitudinal axis and flexible perpendicularly to this axis, and each comprising a ternary composite bundle including fibres and filaments with high mechanical strength, a thermosetting resin agglomerating the threads and filaments into profiled rods of a given shape, and a flexible vulcanised elastomer individually encapsulating each rod and assembling and agglomerating the juxtaposed rods into a bundle, and such that the rods open out at the ends of the bundle where they are intercalated between mats or sheets of synthetic fibre fabrics, as described in the aforementioned French patent, French patent No. 2 474 325 in the name of the Applicant already proposes a manufacturing process consisting firstly in producing separately unitary mats or sheets of fibrous material, each of which is constituted by an assembly of rods impregnated with thermosetting resin and whose ends are gripped between end mats or sheets and lateral end spacers of fabric of fibres likewise impregnated with thermosetting resin, the whole being pressed and polymerised by heating in a first mould, then in piling up several unitary mats or sheets, arranging end spacers, also of mats or sheets of fabric of fibres impregnated with resin, with intercalary layers of adhesive, in a second mould, or assembly mould, to form a bundle of regularly spaced rods, in injecting the encapsulating elastomer in a liquid or viscous state into this bundle, and finally in vulcanising the elastomer, the adopted quality of which will have been chosen in accordance with the qualities of elasticity and/or damping that it is wished to impart to it.

Prior to the formation of the unitary mats, each rod will have been obtained by circulating continuous filaments in a resin impregnation machine, then calibrating the filaments impregnated and united, by passing them through a die enabling a shaped piece of a desired cross-section to be obtained, and finally by cutting the shaped piece to the desired length.

Each rigid end by which the different unitary mats are united forms a block in which can be pierced two bores in which sleeves can be fitted and maintained by cementing to form cappings for securing the element to the members to be connected by means of fixing pins passing through the sleeves. But at least one rigid end of the element can be formed by intercalating between two adjacent unitary mats a layer of longitudinal rovings from a member to be connected, in order to form a splice joint.

At the root of the elongated central portion elastic in flexion and torsion, in each of the rigid ends of the element, there can be provided a short transition area, defined by a chamber filled by injecting an elastomer that is less flexible than that of the matrix in the central portion, and this second elastomer encapsulates the rods in order to reduce the rigidity of their embedding in the root areas in the rigid ends, hence the level of stress that they undergo when the linking arm is subjected to flexion and/or torsion. The use of spacers in the form of wedges on either side of each rigid end of the pile makes it possible to effect pre-blocking in incidence, which may be necessary in the application of such an element with a flexible and torsible central portion as an arm for mechanically linking the resistant framework of a blade and a rotor hub, in order to enable control of the blade in incidence, permitting its flapping and trailing movements.

In this particular application, the aforementioned French patent No. 2 041 747 proposes advantageous embodiments of simplified hubs not comprising, in respect of the link to each blade, the conventional three articulations, pitch, flapping and trailing, while continuing to behave in a manner very similar to that of articulated hubs, with the advantage, moreover, that a suitable choice of rigidity in trailing associated with sufficient damping ensured by the nature of the encapsulating elastomer, makes it possible to dispense with links between the blades and with drag dampers, generally necessary on articulated hubs to avoid imbalance at the time of bringing into rotation as well as the phenomena of ground resonance, flight resonance or blade vibration (so-called "flutter" phenomena).

In certain of its embodiments, the rigid end portions nearest to the axis of rotation of the rotor on the linking arms are combined into a single block, rigidified by the polymerised impregnation resin, and which forms the body of the hub, while, on the blade side, the corresponding rigid end portions are thickened and constituted to form flattened heads by the addition of intercalary reinforcements, it being possible to pierce these heads and fit them with sleeves for fixing double cappings, for securing to the footings of the corresponding blades as well as to the levers for controlling the pitch of these blades.

In one of these embodiments, when it is necessary to increase the structural damping characteristics that the linking arm already possesses, but to an insufficient degree, through the elastomer encapsulating the rods of the elastic bundle, it is proposed to add to all or part of the periphery of the elongated central portion of the linking arm at least one longitudinally rigid strip connected to the elongated central portion by means of an elastomer similar to or different from that used for encapsulating the rods, or again by means of a silicone base adhesive mastic possessing to a high degree properties of deformation remanence, giving rise to structural damping. This strip is not connected, or is connected by one end only, to one of the rigid end portions of the linking arm and, in the event of several strips being provided and separated from one another by a layer of connecting material (elastomer or adhesive mastic), these strips are not connected or are connected each by one end only to one of the rigid end portions of the arm alternately. This strip or these strips do not, therefore, contribute to the elongation of the immediately underlying rods in the bundle, during flexional deformation. The connecting material is thus subjected to shearing deformation which creates, through deformation remanence, the desired additional damping forces.

To obtain this additional damping, this embodiment provides a special application to rotors of general means usable according to the teachings of U.S. Pat. No. 3 160 549 to damp vibrations.

This U.S. patent proposes, in connection with aircraft fuselage panels, chosen as an example of a vibrating structure, a multi-layer vibration damping structure constituted by an alternating pile of a rubbery foam, of polyurethane or silicone rubber, which absorbs vibrations, and of rigid metallic retaining plates, the foam layers being fixed to the vibrating base panels or to the metallic plates of other tiers in the pile by coating layers of a pressure-sensitive adhesive, the damping structure being external to the vibrating panels although preferably turned towards the interior of the fuselage.

The application of an analogous base structure with an elastomer layer, for damping the oscillations of a helicopter rotor blade, has also been proposed in French patent No. 2 336 299. This French patent describes a damping device comprising at least one covering layer, of a material having great rigidity in the direction of the force to be damped, and a damping layer of a visco-elastic material having high internal damping, the two layers being superposed and assembled flat directly on the blade, in the latter's area of dynamic deformation, so that the damping layer is subjected to shearing during the oscillations of the blade, which are thus damped. This damping device forms an integral part of the blade and forms a multi-layer covering thereof, projecting slightly beyond the profile of this blade, whose external appearance it does not substantially affect, particularly if it is placed in a recess provided on the outer face of the blade, at the appropriate points, such as the suction face and/or the pressure face of the trailing edge at the level of the blade footing, or of an area located 7/10 of the way along the span, counting from the blade footing. The or each covering layer can be connected to the blade without any possibility of movement at one end, in order to obtain the greatest possible shearing deformation of the damping layer or layers and, in the event of the device being provided with several covering and damping layers superposed in alternation, the successive covering layers are connected by their ends opposite the blade without any possibility of displacement. In addition, the outer covering layer can be crossed by notches perpendicular to the plane of oscillation of the blade, to prevent stiffening of the blade if the axial length of the layers of the damping device is very long. In this case too, the damping device formed by a laminated and alternating pile of silicone rubber or polyurethane visco-elastic damping layers and rigid covering layers is external to the blade, although possibly accommodated in a recess in the outer face of this blade, in order not to extend too substantially beyond its profile.

A damping device with an elastomer layer of a very similar structure and also external to the member to be damped is proposed in U.S. Pat. No. 4 334 825, for the footings of the blades of a non-articulated helicopter rotor, in order to damp the trailing oscillations. This device includes at least two rigid plates fixed to the opposite faces of the blade footing by several elastomer elements which are cemented or caused to adhere, on one hand, to the corresponding rigid plate and, on the other hand, to the blade footing, being spaced apart from one another in the direction of the blade span, and the damping results from the shearing to which these visco-elastic elements are subjected.

Finally, to equip a rotor having neither a bearing nor an articulation, and each blade of which is linked to the hub by an arm that is elastic in flexion and torsion, which is either the internal radial portion of the spar crossing the footing of the blade, or an arm linked to the hub and connected to the blade spar in its prolongation, U.S. Pat. No. 4 332 525 describes an oscillation damper constituted by an alternating piling of metallic layers and of elastomer layers (silicone rubber) on each of the two plane faces of the elastic arm of rectangular cross-section, and caused to adhere between the corresponding plane face of the arm and the interior of the portion of the rigid shell of the blade opposite. In this case, although the damper is inside the shell of the blade, it is nonetheless outside the element of the blade that is dynamically deformed, that is to say the flexible arm connecting the blade to the hub.

In conclusion, in the last four patents mentioned above, damping is always ensured by at least one layer of elastomer coacting with at least one rigid layer and always placed outside the deformable element. In addition, the damping ensured by these devices external to the member whose deformations are to be damped is not complementary damping but the only damping that is ensured.

According to the invention, in order to permit adaptation in frequency more favourable to the use of certain rigid blades on the non-articulated main rotors of helicopters, it is proposed to increase the integrated damping and, in particular, the damping in trailing, provided by a flexible linking arm of the type described above and known from French patent Nos. 2 041 747 and 2 474 395, without any need to provide this known arm with an external device that is disadvantageous in terms of weight, size, hence of aerodynamic trailing, and of the lack of protection vis-a-vis the external environment.

In other words, the problem with which the invention is basically concerned consists in giving a flexible linking arm, as known from two French patents, a damping capability complementing that already imparted to it by the elastomer encapsulating the rods in the bundle, without recourse to an external device, or again in increasing the structural internal damping of such an elastic linking arm, and in particular the damping in trailing in the case of an application to the linking of rotor blades to their hub, with the help of simple means integral with the linking arm.

For this purpose, the linking arm according to the invention, of the type already described above and known from French patent No. 2 041 747 and No. 2 474 395, is characterised in that the elongated portion which is flexible in flexion and torsion also includes a longitudinal damping core comprising at least one longitudinal, tight chamber, internal to the bundle and filled with a damping fluid, and at least one longitudinal shear member, extending into each chamber and integral by only one of its longitudinal ends with a rigid end portion of the arm, so that any deformation of the elongated portion in at least one direction leads to damping complementary to that provided by the encapsulating elastomer, and obtained by the shearing of the fluid between the shearing member or members and the composite bundle that surrounds them.

Advantageously, when the damping fluid is a product having low creep resistance, at least one tight chamber of the damping core, which is filled with such a damping product, is at least partially delimited by a tight, flexible envelope such as an elastomer bladder, in order to maintain in use the product with low creep resistance in the said envelope.

Advantageously in this case, the damping fluid is a silicone oil or gel with a high molecular weight, little or non-crosslinked, pasty in appearance and having a consistency between that of a liquid and an elastic solid, and presenting "pseudo-plastic" behavior generating high energy dissipation under mechanical stress. In particular, the silicone oil used as a damping fluid is advantageously chosen from the class of methyl polysiloxanes which possess excellent resistance to intense, prolonged shearing forces.

In an advantageous form of embodiment, which permits differential damping in two different directions over the cross-section of the central part of the linking arm, at least one shearing member is a longitudinal strip that is flexible in flexion perpendicularly to its plane and in torsion about its longitudinal axis. In this case, in order to guide the path of shearing of the strip in its plane, in which it is relatively rigid, the longitudinal end of the strip, on the side opposite that whereby the strip is integral with a rigid end portion of the arm, is freely engaged in a guide member integral with the other rigid end portion of the arm. To permit at the same time a better shearing path for the strip, substantially in its plane, and a favourable development of the cross-section of the strip or strips and of the central portion of the arm, with a view to an application to the linking of rotor blades to their hub, at least one strip has a substantially trapezoidal shape with the small base orientated towards its free longitudinal end. In order to favour behaviour in flexion, perpendicularly to its plane, and in torsion, about its longitudinal axis, and at the same time to increase its rigidity, in its plane and perpendicularly to its longitudinal axis, at least one strip, and preferably each of them, is made of composite material and is preferably constituted by a flat bundle of substantially unidirectional rovings of synthetic or mineral fibres which are agglomerated by a polymerised, rigid synthetic impregnation resin.

Advantageously, in order to obtain a balanced distribution of the external stresses, internal constraints and reactions, on either side of the strip or strips of the damping core, the rods of the composite bundle of rods and of encapsulating elastomer are substantially distributed in two halves located respectively on either side of the damping core and opposite the plane faces of the latter's strip or strips.

In a simple form of embodiment, the damping core comprises a single shearing strip whose longitudinal end integral with a rigid end portion of the arm is of one piece with a thickened base for embedding in the said rigid end portion, while the free longitudinal end of the strip is slidingly engaged in a guide slot provided in a guide block for embedding in the other rigid end portion of the arm, the said block being substantially of the same thickness as the base, and a tight, elastic envelope, in the form of a sleeve, connects the base to the guide block by tightly closing about the strip a single chamber filled with damping fluid. The damping core can thus be designed in the form of a pre-constituted assembly that is then integrated in the pile of unitary mats or sheets prepared, for example, according to the teachings of French Patent No. 2 474 395, to form the skeleton of the flexible linking arm, then the damping core is imprisoned in the elastomer encapsulating the rods that is cast or injected into the pile to be vulcanised and complete the flexible composite bundle.

However, depending on the desired level of damping, the damping core can also comprise several strips. In particular, it can include a non-contiguous piling of several strips substantially parallel and spaced apart from one another within a single chamber filled with the damping fluid and closed by a single tight, flexible envelope. In this case, it is possible that the longitudinal ends whereby the strips are integral with a rigid end portion of the arm may each be of one piece with a thickened base for embedding alternately in one or the other of the said rigid end portions of the arm. In addition, the longitudinal ends of the strips that are integral with one and the same rigid end portion of the arm can be of one piece with a single solid base for embedding in the said rigid end portion of the arm. Furthermore, it is possible that at least a base for embedding in a rigid end portion of the arm can at the same time form a guide block, having at least one guide slot in which is slidingly engaged the free longitudinal end of a blade the other longitudinal end of which is integral with a base for embedding in the other rigid end portion of the arm.

According to the teachings of French patent No. 2 042 747, it is advantageous for the rods in the composite bundle to be extended on either side of the elongated central portion and to be, at least on one side of the latter, arranged in mats or sheets of rods superposed in a piling alternating with intercalary reinforcements of armature in relatively rigid plates and/or layers of fabrics of mineral or synthetic fibres, the piling being agglomerated by a polymerised, rigid synthetic impregnation and/or encapsulating resin to form at least one rigid end portion of the arm, and in this case, according to a characteristic proper to the invention, it is additionally advantageous for at least one base for embedding and-/or at least one block for guiding a strip to be intercalated and integrated in the said alternating pile. To improve further integration in the corresponding rigid end portion, when the linking arm comprises at least one guide member, it is advantageous for the latter to include at least two rigid plates, substantially parallel, integrated in the agglomerated pile forming the corresponding rigid end portion of the arm, and separated from one another by at least one intercalary layer of the piling, with the two plates of the guide member projecting into the chamber internal to the bundle in order to delimit between them at least one slot for guiding a shearing strip.

The invention also relates to a multi-blade rotor each of whose blades is connected to the hub of the rotor by a linking arm proper to the invention and as defined hereabove, whose two rigid end portions are connected one to the footing of the corresponding blade and the other to the hub.

In the case of a multi-blade rotor of variable pitch and constituting at least one part of the rotating aerofoil of an aerodyne, it is at the same time advantageous, in order to increase damping in trailing, without excessively increasing the pitch change control forces, for the strip or strips of the damping core of each linking arm to be substantially parallel to the plane of rotation of the rotor. In order to obtain a more favourable dynamic response of the arm that is flexible in flapping, it is also advantageous that, on one hand, the cross-section of the elongated central portion of each linking arm and, on the other hand, the width of at least one strip of the damping core of each linking arm should decrease progressively from the rigid end portion of the arm that is connected to the hub towards that which is connected to the blade. To obtain a favourable development of the cross-section, it is possible for the maximum width of the elongated central portion of each linking arm, measured perpendicularly to its longitudinal axis and substantially in the plane of rotation of the rotor, to remain constant while its thickness measured substantially perpendicularly to the said plane of rotation decreases progressively from the rigid end portion connected to the hub towards that connected to the blade.

Generally speaking, in a rotor according to the invention, the elongated central portion of each linking arm has a cross-section that is substantially oval in shape, with the large axis located substantially in the plane of the rotor, or polygonal, in particular octagonal, with two large sides parallel to one another and substantially to the plane of the rotor.

Finally, the invention relates to a rotor hub of the type comprising a rigid central body, designed to be integral in rotation with a rotor mast about an axis of rotation of the rotor, and substantially radial arms, equal in number to the number of blades of the rotor, and each connecting a blade to the hub body, and, according to the invention, the latter is characterized in that the radial arms are linking arms according to the invention and as defined hereabove, whose rigid end portions each designed to be connected to a corresponding blade are formed into blade take-up members, such as cappings, while the other rigid end portions of the arms are integrated in the hub body.

Figure 1:
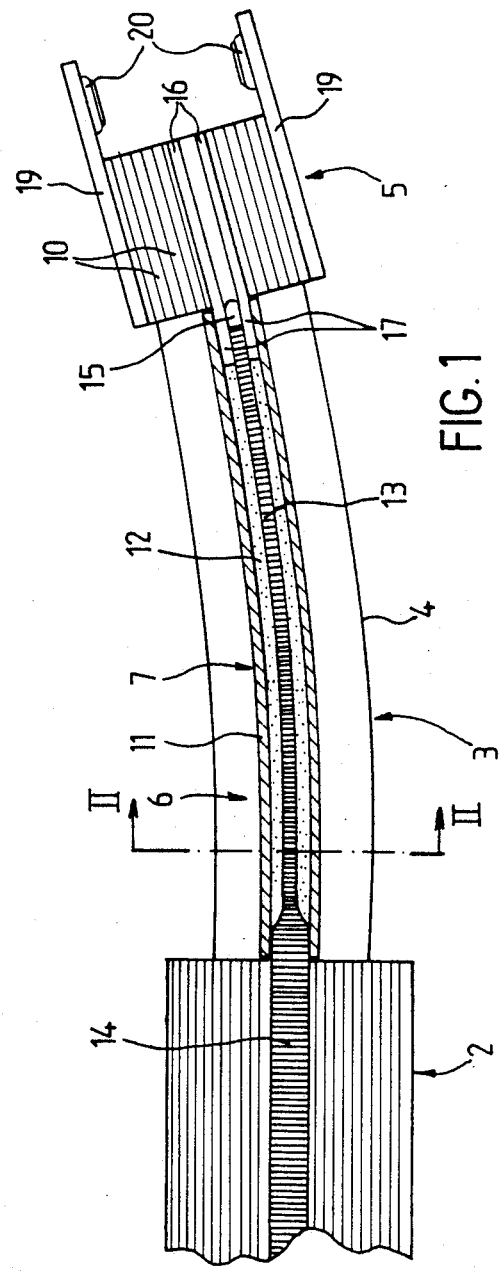
Figure 3:
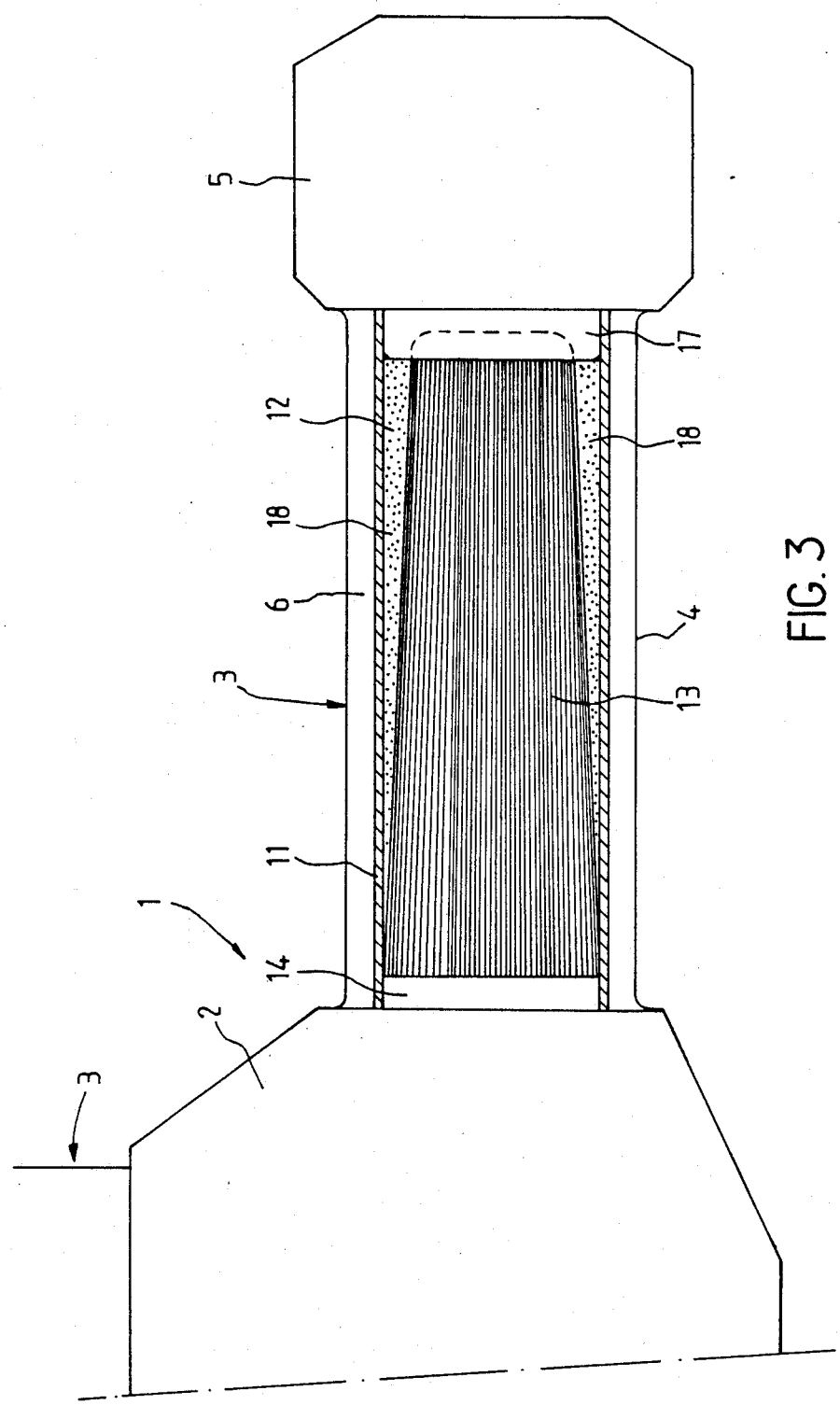
Figure 4:
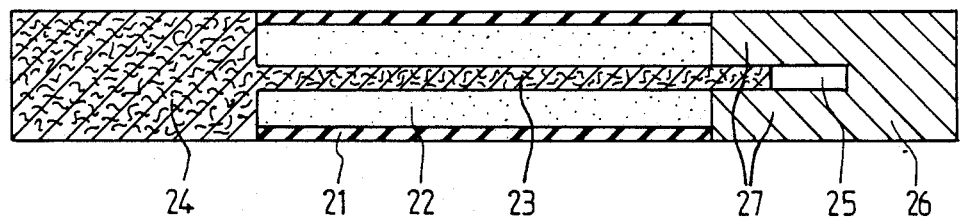
Figure 5:
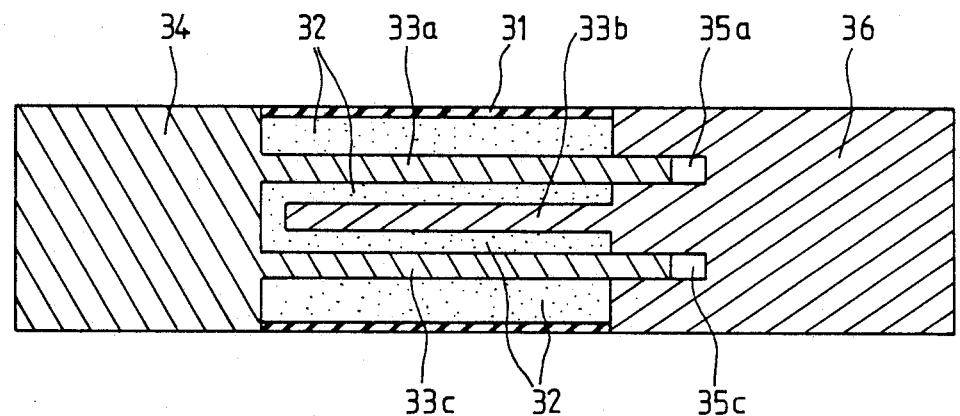

The invention will be more readily understood, and further advantages and features of the invention will be apparent, from reading the description given herebelow, on a non-limitative basis, of several examples of embodiment described with reference to the annexed drawings wherein:

FIG. 1 is a schematic view in longitudinal section through a vertical plane of a radial linking arm of a "non-articuated" helicopter hub, represented in a position deformed in flapping, FIG. 2 is a schematic view in cross-section along II—II of the linking arm of FIG. 1, FIG. 3 is a top view of the "non-articulated" hub, partially cut away at the flexible central portion of the linking arm of FIG. 1 the better to represent its internal structure, FIG. 4 is a schematic view in longitudinal section of a damping core with a single shearing strip that can be used in the flexible arm of FIG. 1, FIG. 5 is a view analogous to that in FIG. 4 of a damping core with three shearing strips, FIG. 6 is a schematic top view analogous to that in FIG. 3 of a flexible linking arm of a second example of non-articulated hub, and FIGS. 7 and 8 are schematic views in cross-section along VII—VII and longitudinal section along VIII—VIII respectively of the linking arm in FIG. 6.

With reference to FIGS. 1 to 3, the "non-articulated" hub, generally designated by reference number 1, comprises a central body 2 and several substantially radial arms 3, each of which is designed to link a blade (not shown) of the rotor to hub 1. Each linking arm 3 comprises an elongated central portion 4, which is flexible in torsion and flexion, and which extends substantially radially between two rigid end portions, one of which, in internal radial position, is directly integrated in the internal radial rigid end portions of the other linking arms 3 to form the central body 2 of the hub, while the other rigid end portion, 5, in external radial position, is shaped to form a capping for taking up the corresponding blade.

The elongated central portion 4 includes a ternary composite bundle 6 designed according to the teachings of French patents No. 2 041 747 and No. 2 174 395, with the essential difference that it is designed as a peripheral bundle surrounding a longitudinal damping core 7 thus integrated in the centre of bundle 6. It should be remembered that the latter, as represented in FIG. 2, comprises a system of rods 8, parallel and spaced in relation to one another, having high mechanical strength particularly in traction, presenting a certain elasticity in flexion, and each of which is, for example, obtained by the parallel grouping of a very large number of continuous threads and/or filaments of a mineral material such as glass or carbon, or a synthetic material, such as aramide fibres, particularly those marketed under the brand name "KEVLAR", and which are encapsulated in a thermosetting resin of the epoxide type for example, so that these threads or filaments occupy 50 to 80% of the volume of each rod 8, the rest being occupied by the resin and its hardener. Although, in FIG. 2, the cross-section of the rods is circular, it is clear that these rods can have any other desirable section, for example flattened or oval, or even polygonal, in particular rectangular, triangular or hexagonal. For this reason, it is preferable for each rod 8 to be produced by a profiled assembly of rovings of fibres and/or filaments of the selected mineral or synthetic material. For this purpose, continuous rovings are circulated in an impregnation machine containing the thermosetting resin, then the rovings impregnated and united side by side are calibrated by passing them through a die to obtain a shape of the desired cross-section and, finally, the shape is cut into rods 8 having the desired length. Owing to their high mechanical strength and their modulus of elasticity which is of a comparatively low value, the rods have a certain flexibility in flexion. In the central portion 4 of flexible arm 3, these rods 8 are individually encapsulated by a vulcanised flexible elastomer 9 which agglomerates and assembles the rods 8, forming bundle 6, approximately 25 to 50% in volume of which is occupied by this elastomer 9, the remainder being occupied by the rods 8. When the latter have a triangular or hexagonal cross-section, the proportion of elastomer 9 in bundle 6 can be reduced. This elastomer 9 is silicone or polyurethane based, and has a rather low shearing modulus, so as to permit small relative displacements of rods 8 when arm 3 is deformed in flexion and torsion. In addition, it possesses noteworthy deformation remanence, so that any deformation work is accompanied by a transformation of energy into heat, which results in dynamic damping of the movements to which flexible arm 3 is subjected. Encapsulating elastomer 9 is deformable but practically incompressible; consequently, a deformation applied to the elongated central portion 4 of the arm results in a difference in length of at least some of rods 8, accompanied by a distortion of elastomer 9. The latter permits relative movement of the adjacent rods 8, while having sufficient toughness to permit only a small variation in the relative position of the axis of the rods, which enables bundle 6 to work as a single composite body during its deformations in flexion and torsion. In this bundle 6, rods 8 encapsulated by elastomer 9 retain and imprison the latter, except in the portion immediately on the periphery of bundle 6, by constituting a sort of bond or collar for elastomer 9, so that the latter cannot escape from bundle 6 or break through distension or crushing. This bonding effect can be reinforced by surrounding bundle 6 with a deformable but inextensible sheath. The lateral surface of rods 8 can be prepared to favour the adherence to the latter of the vulcanised flexible elastomer 9, in which the rods are embedded and which ensures their assembly or agglomeration into a single composite ternary bundle 6.

To ensure good connection of flexible central portion 4 to rigid end portions 2 and 5 of each linking arm 3, rods 8 of its bundle 6 extend, on either side of central portion 4, into rigid portions 2 and 5, which are reinforced by complementary armatures, constituted by metallic or composite rigid plates and/or layers of fabrics of fibres, for example of glass. In this way, each rigid end portion 2 or 5 is formed of a laminated block constituted by an alternating piling of parallel layers 10 including mats or sheets of fibre fabrics which sandwich the ends of rods 8 of the unitary mats or sheets piled to constitute bundle 6 when the latter is produced using the process according to French patent No. 2 474 395, plates and/or layers of intercalary reinforcing fibre fabrics and also, substantially in the middle of each piling, at least one flat, rigid element for embedding a longitudinal end of damping core 7, as described in greater detail herebelow, the whole of each piling being agglomerated and rigidified by a thermosetting resin impregnating or encapsulating the different constituent layers 10, the rigidity of which is far greater than that of elastomer 9 encapsulating rods 8 in central portion 4, this resin being, for example, a resin of the epoxide type, possibly identical with that used for agglomerating the rovings at the time of forming rods 8.

It is essential for the resin agglomerating the pilings of end blocks 2 and 5 to be a polymerised rigid material with a very high shearing factor in order to introduce and to distribute in rods 8 the loads originating from the blade connected to external radial block 5 or from hub body 2 with which the internal radial block is directly integrated.

In the example represented in FIG. 2, the mats or sheets of rods 8 of bundle 6 are symmetrically distributed in relation to the median plane parallel to the plane of the rotor, on either side of a longitudinal central pocket of an oblong shape in the transverse direction, which is formed in encapsulating elastomer 9 and occupied by damping core 7, and the development of the number of rods 8 in the different mats or sheets is such that bundle 6 has a cross-section in the shape of an irregular octagon, whose opposite two sides parallel to the plane of the rotor have a length that is more than twice that of the other sides, which gives the section of bundle 6 a generally oval shape, having its large axis parallel to the plane of the rotor and its small axis perpendicular to this plane, which permits easier flexion in the direction of flapping of the blades (perpendicular to the rotor plane) than in the direction of trailing (in the plane of the rotor) of the blades, and which simultaneously makes it possible to reduce rigidity in torsion in relation to a circular section.

Damping core 7 includes a flexible, tight bladder 11, of elastomer, which delimits inside bundle 6 a tight internal chamber filled with a damping fluid 12 itself surrounding a longitudinal strip 13. This strip 13, which is trapezoidal in shape in plan view (see FIG. 3) with the large base orientated towards hub body 2 and the small base orientated towards the rigid end block shaped to form capping 5 for taking up the blade, is a composite strip constituted for example by a flat bundle of KEVLAR unidirectional rovings agglomerated by a polymerised synthetic impregnation resin, so that the said strip 13 is relatively flexible in flexion, perpendicularly to its mean plane substantially the same as the median plane of bundle 6 and the plane of the rotor, and flexible in torsion about its longitudinal axis, substantially the same as that of linking arm 3, which enables strip 13 to follow the flapping oscillations and the pitch change movements undergone by capping 5 for attaching to the corresponding blade. By its large base, strip 13 is integral with a substantially flat base 14, also of composite material, thick in relation to strip 13, and which is intercalated and agglomerated rigidly in the piling that constitutes hub body 2 to ensure the embedding of strip 13 by its widest longitudinal end. On the other hand, the less wide longitudinal end of strip 13, at its small base, is a free end engaged in such a way as to be able to slide freely in a guide slot 15 that is delimited between end portions 17, projecting into bladder 11, of two rigid, parallel plates 16 which are intercalated and agglomerated rigidly in the piling that constitutes rigid end block 5, being separated from one another by a number of layers 10 of this piling so as to ensure the embedding in this block 5 of the guide member thus provided for the free end of strip 13.

The damping fluid 12 used is a silicone oil or gel of the type comprising linear molecular chains constituted by elements formed of alternating silicium and oxygen atoms, and more precisely of the class of methyl polysiloxanes which have an exceptional set of properties owing to their molecular structure, such as characteristic surface properties of hydrophobia and anti-adherence, properties of resistance to high and low temperature, to oxidation and to hydrolysis, great chemical inertia (no risk of corrosion), non-miscibility with many organic products, high compressibility and small variation in viscosity under the influence of temperature, and particularly remarkable resistance to intense, prolonged shearing forces, whence their use as damping fluids. This fluid is thus a material with a high molecular weight, little or not crosslinked, that takes the physical form of a pasty gel with a consistency between that of a liquid and an elastic solid, and it presents a "pseudoplastic" behaviour at high shearing rates. Under mechanical stress, it produces high dissipation of energy in the form of heat. Tight envelope 12 ensures the retention of this product, which has low creep resistance. By way of example, the fluid used is a silicone gel marketed by the Rhône-Poulenc Company under reference RP771, without a crosslinking agent, that is to say that cannot be vulcanised. It should be noted that this material, in a vulcanised form, is used for the manufacture of visco-elastic elastomer. This damping gel offers good qualities of resistance to intense, prolonged shearing forces with a range of dissipative shear moduli "G" practically from 0.03 Megapascal to 0.1 Megapascal.

Damping core 7 thus constituted, with a very simple structure, easy to produce and integrate in bundle 6, and the rigid end blocks 2 and 5 ensure, at the time of deformations in trailing of arm 3, i.e. when capping 5 is displaced with the corresponding blade footing in the plane of the rotor, or in the plane of strip 13, in relation to hub body 2, efficient damping by the shearing of damping gel 12 between strip 13, integral with hub body 2, and elastomer envelope 11 which follows the deformations in trailing of bundle 6 of arm 3. On the other hand, during deformations in flapping of arm 3, perpendicularly to the plane of strip 13, or in torsion about its longitudinal axis, strip 13 does not ensure any noteworthy shearing of damping gel 12, but it does not notably oppose deformations in these directions of bundle 6 either.

Generally speaking, the different relative displacements of rigid end blocks 2 and 5, hence of the footing of the corresponding blade in relation to hub 1, are permitted by the deformation of the elongated central portion 4, in bundle 6 of which rods 8 vary elastically in length, while encapsulating elastomer 9 undergoes elasto-plastic distortion, this elastomer 9 being sufficiently flexible to permit torsion, about the longitudinal axis of the arm, by an angle suitable for necessary pitch control of the blade, and causing elongation with helical conformation of peripheral rods 8 of bundle 6 in relation to the more central rods 8, in the immediate vicinity of damping core 7, and with relative displacement of the peripheral rods in relation to the more central rods. The deformation remanence of encapsulating elastomer 9 ensures under these conditions a damping of the movements to which flexible central portion 4 of arm 3 is subjected, by reason of the displacements that are imposed upon capping 5 by the blade, and to this internal damping connected with the presence and nature of encapsulating elastomer 9 is added a complementary internal damping, resulting from the shearing of damping gel 12 by strip 13, when arm 3 is deformed in trailing.

By appropriate dimensioning and choice of the forms of linking arm 3 and, in particular of its flexible central portion 4, in section and along the span (in a longitudinal direction), suitable rigidity in trailing can be associated with sufficient damping in flapping and in torsion, ensured by elastomer 9, and adapted in trailing by the combined effects of elastomer 9 and damping core 7, which makes it possible to dispense with inter-blade links and trailing dampers of all types, each articulated between, on one hand, a corresponding blade and, on the other hand, the hub.

Of course, the dimensioning of strip 13, the development of its width and, possibly, of its thickness, hence of the volumes in the form of wedges 18 occupied by gel 12 between envelope 11 and strip 13 towards its small base, as well as the development of the cross-section of flexible central portion 4, from hub body 2 to capping 5, also contribute to determining the response in frequency of flexible arm 3 to the different stresses that are applied thereto. In addition, to permit more favourable positioning of the imaginary axes of flapping and trailing of the blade in relation to the axis of rotation of the rotor, or central axis of hub body 2, it may be desirable to reduce progressively the surface of the cross-section of flexible central portion 4, from hub body 2 towards capping 5, the width of bundle 6, measured perpendicularly to its longitudinal axis and in the plane of the rotor remaining constant, hence also the width of damping core 7, while the thickness of bundle 6, measured perpendicularly to the plane of strip 13 decreases progressively, while the thickness of damping core 7 also remains constant.

Vulcanisable elastomer 9 and the thermosetting resin agglomerating the rovings in rods 8 which respectively, after crosslinking and polymerisation, form the encapsulation of rods 8 and bind the latter to give its solid form to central portion 4 of linking arm 3, must be without any affinities, that is to say must not react chemically with one another, or with the elastomer of bladder 11, and they must also have processing temperatures that are mutually compatible and compatible with that of the resin linking the pilings of end blocks 2 and 5 to permit a single heat treatment in the same mould for manufacturing in a single operation linking arm 3 or even the entire hub 1, with its different linking arms 3. Furthermore, the elastomers and resins used must be watertight and insensitive to atmospheric agents to ensure the insulation and protection of rods 8.

To complete the description of linking arm 3 in FIGS. 1 to 3, it can be added that member 5 for taking up the corresponding blade footing which is a piling rigidified by a thermosetting resin of layers 10 and plates 16 of different kinds, can be arranged as a capping in different ways: as represented in FIG. 1, the capping can be designed with two arms 19, in the form of rigid plates, integrated with the rigidified piling, one above and one below the block thus formed, and having ends projecting in relation to the said block, on the side opposite the central portion 4, and which are pierced by two pairs of orifices that are opposite and coaxial, equipped with sleeves 20 for the passage of pins for retaining the blade footing or a metallic fitting in the form of a double capping itself permitting the retention of the blade footing and of one piece with a pitch control lever. But rigid end block 5, which is thick in relation to central portion 4, and in the form of a flattened head, particularly through the addition of the intercalary reinforcements and plates 16, can also be pierced in its thickness by bores lined with fitted, cemented sleeves, for the passage of pins for fixing a built-on double capping itself directly ensuring the retention of the blade footing while being integral with the pitch control lever.

FIG. 4 diagrammatically represents another example of a damping core, taking the form of a pre-mounted assembly, ready to be combined with a bundle of encapsulated rods, for example in place of damping core 7 of linking arm 3 in FIGS. 1 to 3. This pre-constituted assembly also includes a composite single shearing strip 23, one longitudinal end of which is of one piece with a composite, thickened base 24, designed to be embedded in one of the rigid end portions of the arm. The other end of strip 23 is free and slidingly engaged in slot 25 delimited between two portions 27 of a composite guide member 26, designed to be embedded in the other of the rigid end portions of the arm, and strip 23 is encapsulated with damping gel 22 filling the chamber delimited, about this strip 23, between the opposite faces of base 24 and of guide block 26, and by flexible, tight elastomer bladder 21. This pre-constituted damping core is integrated in the piling of mats of rods 8, during this piling, to constitute the skeleton of bundle 6, when the damping core is imprisoned in the elastomer, such as a polyurethane encapsulating rods 8, when this elastomer 9 is cast or injected in and about the skeleton.

The damping core can also comprise several shearing strips, according to the desired level of damping, and an example of such a device with three strips is schematically represented in FIG. 5.

In this example, the three shearing strips 33a, 33b and 33c are parallel to one another and spaced apart from one another in a non-contiguous piling, and strips 33a and 33c, which are the furthest from one another, are both integral with one and the same solid base 34, by their longitudinal ends located on the same side, while their longitudinal ends on the opposite side are free and each slidingly received in one respectively of two slots 35a and 35c provided in one and the same solid guide block 36. The latter constitutes at the same time the base with which central strip 33b is integral by its longitudinal end on the corresponding side, while the other longitudinal end of this strip 33b is free and is not slidingly engaged in a slot in solid base 34, but extends to within a short distance of the latter. Bases 34 and 36 are designed to be embedded each in one of the two rigid end portions of a flexible arm and, preferably, base 34 in the portion connected to or integrated with the hub, and base 36 in the portion connected to the corresponding blade. In this example too, bladder 31 in the form of a flexible tight sleeve extends between the two bases 34 and 36 and closes the chamber filled with damping gel 32 surrounding strips 33a, 33b and 33c. Damping is obtained by shearing of gel 32 between each of strips 33a and 33c, integral with the hub body, and strip 33b and envelope 31 which follow the deformations of the bundle of encapsulated rods of the flexible arm, particularly in trailing if the three strips are parallel to the trailing plane of the rotor.

The example of linking arm 43 represented in FIGS. 6 to 8 presents numerous characteristics in common with that described above with reference to FIGS. 1 to 3. Indeed, there can be found a flexible central portion 44, extending between two rigid end portions 42 and 45, and constituted by a bundle 46 of rods 48 individually encapsulated in a flexible, vulcanised elastomer 49, and a damping core 47, longitudinal, in a central position, and surrounded by bundle 46. This core 47 comprises, in this example too, a single shearing strip 53, substantially trapezoidal in shape, integral by its large base with a base 54 embedded in rigid end portion 42, and the small base of which forms a free end slidingly engaged in a slot of a guide member 56 embedded in the other rigid end portion 45, strip 53 extending in a damping gel 52 filling a chamber delimited inside bundle 46 by a tight flexible bladder 51. In this example too, the cross-section of flexible portion 44 is in the form of an octagon of which two sides parallel to the faces opposite strip 53 and the trailing plane of the rotor are larger than the other sides, and bundle 46 is distributed in two symmetrical halves on either side of damping core 47. However, in this example, bundle 46 includes a far larger number of rods 48, each of which has a cross-section smaller than that of rods 8 in bundle 6 in the example in FIGS. 1 to 3, and bundle 46 is obtained by piling a larger number of mats of rods 48, whereof each mat comprises a larger number of rods 48, as can clearly be seen when comparing FIGS. 2 and 7. FIG. 8 schematically represents the piling of mats 60 of encapsulated rods 48, on either side of damping core 47, and forming bundle 46 whose thickness progressively decreases from one of the rigid end portions 42 to the other 45. These portions 42 and 45 are solid blocks in the form of flattened heads, each constituted by an alternating piling of the ends of mats 60 gripped and crushed in a sandwich between layers of fibre fabrics, and of intercalary reinforcing layers 50, also of fibre fabrics, with embedding of base 54 or of guide member 56 in the centre of the corresponding piling, which is connected by a polymerized encapsulating and/or impregnating thermosetting resin. It is noted that the thicknesses of rigid blocks 42 and 45 are respectively slightly greater and smaller than the thickness of the respectively adjacent ends of bundle 46, and each block 42 or 45 can be arranged as a capping for connection respectively to the hub and to the footing of corresponding blade, by piercing bores lined with sleeves or rings for the passage of connecting pins.

As before, the central portion 44 of linking arm 43 has a developing section, the surface of which is greater towards the hub than towards the blade, so that the characteristic frequencies of oscillation of the blade and the development of the stresses can thus be better adjusted. In addition, the substantially oval cross-section of this central portion 44 can have its largest axis slightly angled towards the plane of the rotor, by the same angle as the footing of the corresponding blade, so that the main axes of inertia of the sections of the arm and of the blade are then aligned, which ensures better continuity of the rigidities of the blade and of the hub, favourable to the dynamic behaviour of the rotor, and which simplifies at the same time the design of the blade pitch control lever.

In these different examples of embodiment, it is noted that the simplicity and gain in size obtained lead to an important reduction in weight, to better areodynamic fineness, and to relatively easy and inexpensive manufacture of non-articulated hubs equipped with such linking arms.

We claim:

1. Linking arm designed to connect two relatively rigid bodies, such as a rotor blade and a hub (1), permitting limited relative displacements of these bodies equivalent to rotations about at least one axis and, preferably, about three axes orthogonal two by two, and comprising, between two rigid end portions (2,5), each designed to be attached to, or at least partially, integrated with one of the bodies, an elongated central portion (4), flexible in flexion and torsion, ensuring with damping elastic bias towards a mean rest position of the two bodies, and which includes a longitudinal composite bundle (6) of rods (8) that are substantially unidirectional, of high mechanical strength, in particular tensile strength, each of which has a certain elasticity and is formed by the agglomeration of a large number of mineral or synthetic fibres and/or filaments by a polymerised synthetic impregnation resin, each rod (8) being individually encapsulated by a flexible vulcanised elastomer (9), having a relatively low shearing factor and considerable deformation remanence, which agglomerates the said rods (8) forming the said composite bundle (6), characterised in that the elongated portion (4) also includes a longitudinal damping core (7) comprising at least one longitudinal, tight chamber, internal to the bundle (6) and filled with a damping fluid (12), and at least one longitudinal shearing member (13) extending into each chamber and integral by only one of its longitudinal ends with a rigid end portion (2) of the arm (3), so that any deformation of the elongated portion (4) in at least one direction leads to damping complementary to that provided by the encapsulating elastomer (9), and obtained by the shearing of the fluid (12) between the shearing member or members (13) and the composite bundle (6) that surrounds them.

2. Linking arm according to claim 1, characterised in that at least one tight chamber of the damping core (7) is at least partially delimited by a tight, flexible envelope (11) such as an elastomer bladder.

3. Linking arm according to claim 2, characterised in that the damping fluid (12) is a silicone oil or gel with a high molecular weight, slightly or not crosslinked, pasty in appearance and having a consistency between that of a liquid and an elastic solid, and presenting "pseudo-plastic" behaviour generating high energy dissipation under mechanical stress.

4. Linking arm according to claim 3, characterised in that the silicone oil is chosen from the class of methyl polysiloxanes.

5. Linking arm according to claim 1, characterised in that at least one shearing member is a longitudinal strip (13) rigid in flexion in its plane but flexible in flexion perpendicularly to its plane and in torsion about its longitudinal axis.

6. Linking arm according to claim 5, characterised in that the longitudinal end of at least one strip (13), on the side opposite that whereby the said strip (13) is integral with a rigid end portion (2) of the arm (3), is freely engaged in a guide member (16) integral with the other rigid end portion (5) of the arm (3).

7. Linking arm according to claim 5, characterised in that at least one strip (13) has a substantially trapezoidal shape with the small base orientated towards its free longitudinal end.

8. Linking arm according to claim 5, characterised in that at least one strip (13), but preferably each of them, is made of composite material and is preferably constituted by a flat bundle of substantially unidirectional rovings of synthetic or mineral fibres which are agglomerated by a polymerised synthetic impregnation resin.

9. Linking arm according to claim 5, characterised in that, in the bundle (6) of rods (8) and encapsulating elastomer (9), the rods (8) are substantially distributed in two halves located respectively on either side of the damping core (7) and opposite the plane faces of the latter's strip or strips (13).

10. Linking arm according to claim 6, characterised in that the damping core (7) comprises a single shearing strip (13) whose longitudinal end integral with a rigid end portion (2) of the arm (3) is of one piece with a thickened base (14) for embedding in the said rigid end portion (2), while the free longitudinal end of the strip (13) is slidingly engaged in a guide slot (15) provided in a guide block (16) for embedding in the other rigid end portion (5) of the arm (3), the said block (16) being substantially of the same thickness as the base (14), and a tight, flexible envelope (11), in the form of a sleeve, connects the base (14) to the guide block (16) by tightly closing about the strip (13) a single chamber filled with the damping fluid (12).

11. Linking arm according to claim 5, characterised in that the damping core includes a non-contiguous piling of several strips (33a, 33b, 33c) substantially parallel and spaced apart from one another, within a single chamber filled with the damping fluid (32) and closed by a single tight, flexible envelope (31).

12. Linking arm according to claim 11, characterised in that the longitudinal ends whereby the strips (33a, 33b, 33c) are integral with a rigid end portion of the arm are each be of one piece with a thickened base (34, 36) for embedding alternately in one or the other of the said rigid end portions of the arm.

13. Linking arm according to claim 11, characterised in that the longitudinal ends of the strips (33a, 33c) that are integral with one and the same rigid end portion of the arm are of one piece with a single solid base (34) for embedding in the said rigid end portion of the arm.

14. Linking arm according to claim 12, characterised in that at least one base (36) for embedding in a rigid end portion of the arm at the same time forms a guide block having at least one guide slot (35a, 35c) in which is slidingly engaged the free longitudinal end of a strip (33a, 33c) the other longitudinal end of which is integral with a base (34) for embedding in the other rigid end portion of the arm.

15. Linking arm according to claim 10, wherein the rods (48) in the composite bundle (46) are extended on either side of the elongated central portion (44) and are, at least on one side of the latter, arranged in mats or sheets (60) of rods superposed in a piling alternating with intercalary reinforcements (50) of armature in relatively rigid plates and/or layers of fabrics of mineral or synthetic fibres, the piling being agglomerated by a polymerised, rigid synthetic impregnation and/or encapsulating resin to form at least one rigid end portion (42, 45) of the arm (43), characterised in that at least one base for embedding (54) and/or at least one block (56) for guiding a strip (53) is intercalated and integrated in the said alternating pile (42, 45).

16. Linking arm according to claim 15, characterised in that it comprises at least one guide member including at least two rigid plates (16), substantially parallel, integrated in an agglomerated piling forming a rigid end portion (5) of the arm (3), and separated from one another by at least one intercalary layer (10) of the piling, with said plates (16) projecting (17) into the chamber internal to the bundle (6) in order to delimit between them at least one slot (15) for guiding a strip (13).

17. Multi-blade rotor, characterised in that each of the blades of the rotor is connected to the hub (1) of the rotor by a linking arm (3) according to claim 1, whose two rigid end portions (2, 5) are connected one (5) to the footing of the corresponding blade and the other (2) to the hub (1).

18. Multi-blade rotor according to claim 17, of variable pitch and constituting at least one part of the rotating aerofoil of an aerodyne, characterised in that the strip or strips (13) of each linking arm (3) is or are substantially parallel to the plane of the rotor.

19. Multi-blade rotor according to claim 18, characterised in that, on one hand, the cross-section of the elongated central portion (4) of each linking arm (3) and, on the other hand, the width of at least one strip (13) of each linking arm (3) decrease progressively from the rigid end portion (2) connected to the hub (1) towards that (5) which is connected to the blade.

20. Rotor according to claim 19, characterised in that the maximum width of the elongated central portion (4) of each linking arm (3), measured perpendicularly to its longitudinal axis and substantially in the plane of rotation of the rotor, remains constant while its thickness measured substantially perpendicularly to the said plane of rotation decreases progressively from the rigid end portion (2) connected to the hub (1) towards that (5) connected to the blade.

21. Rotor according to claim 17, characterised in that the elongated central portion (4) of each linking arm (3) has a cross-section that is substantially oval in shape, with the large axis located substantially in the plane of the rotor, or polygonal, in particular octagonal, with two large sides parallel to one another and substantially to the plane of the rotor.

22. Hub of a rotor according to claim 17, of the type comprising a rigid central body (2), designed to be integral in rotation with a rotor mast about an axis of rotation of the rotor, and substantially radial arms (3), equal in number to the number of blades of the rotor, and each linking a blade to the hub body (2), characterised in that the substantially radial arms are linking arms (3) according to one of claims 1 to 16, whose rigid end portions (5) each designed to be connected to a corresponding blade are formed as blade take-up members, such as cappings (5), while the other rigid end portions (2) of the arms (3) are integrated in the hub body (2).

* * * * *